Nov. 23, 1971    ISAMU NISHIKAWA ET AL    3,621,517
APPARATUS FOR PRODUCING THERMOPLASTIC RESIN MOLDINGS
Filed Nov. 4, 1968                    10 Sheets-Sheet 1
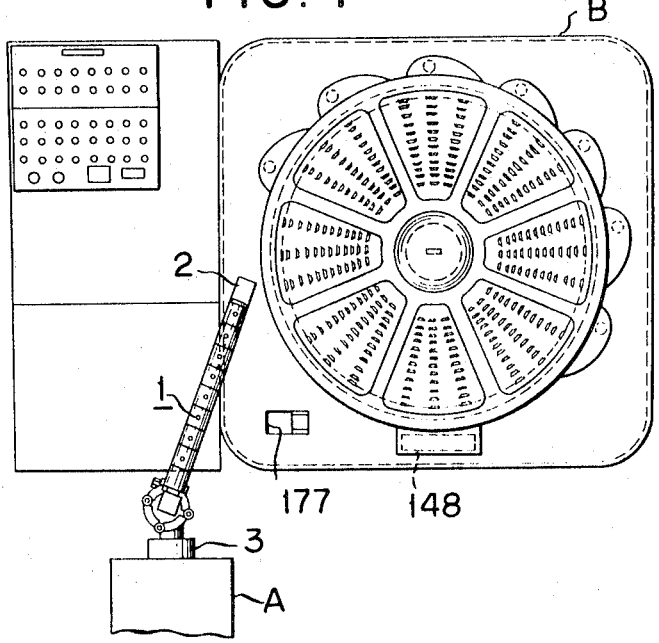
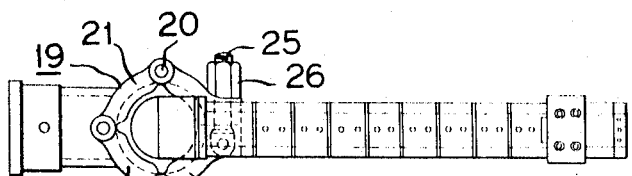
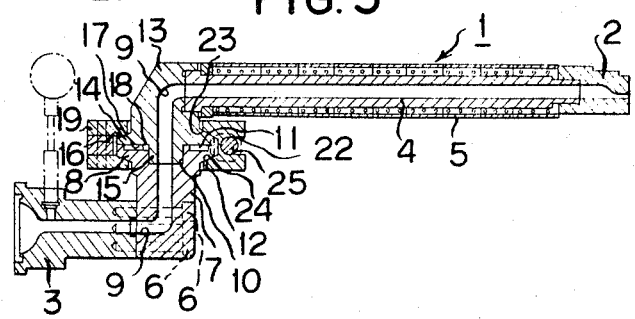
INVENTORS
ISAMU NISHIKAWA
SHIGEO TASAKA
BY
ATTORNEYS

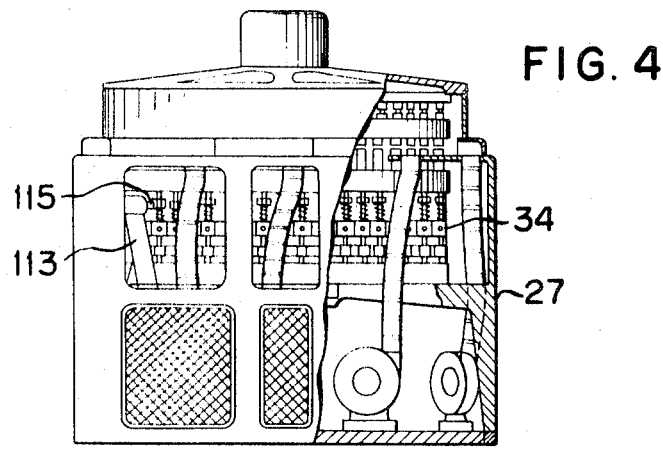
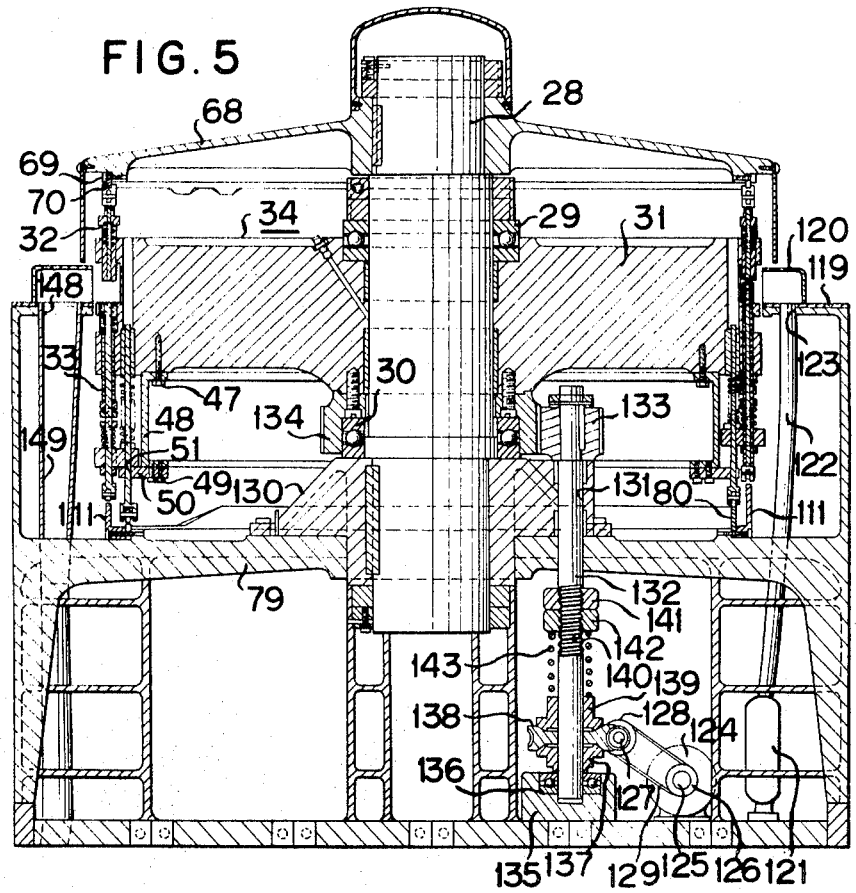

Nov. 23, 1971  ISAMU NISHIKAWA ETAL  3,621,517
APPARATUS FOR PRODUCING THERMOPLASTIC RESIN MOLDINGS
Filed Nov. 4, 1968  10 Sheets-Sheet 4

INVENTORS
ISAMU NISHIKAWA
SHIGEO TASAKA
BY McGlew and Toren
ATTORNEYS

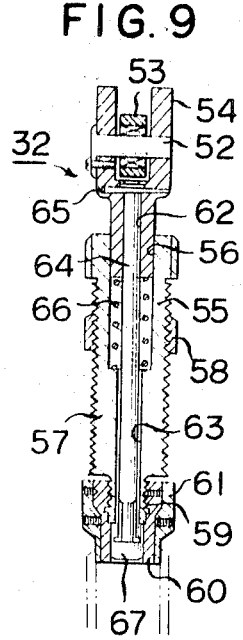
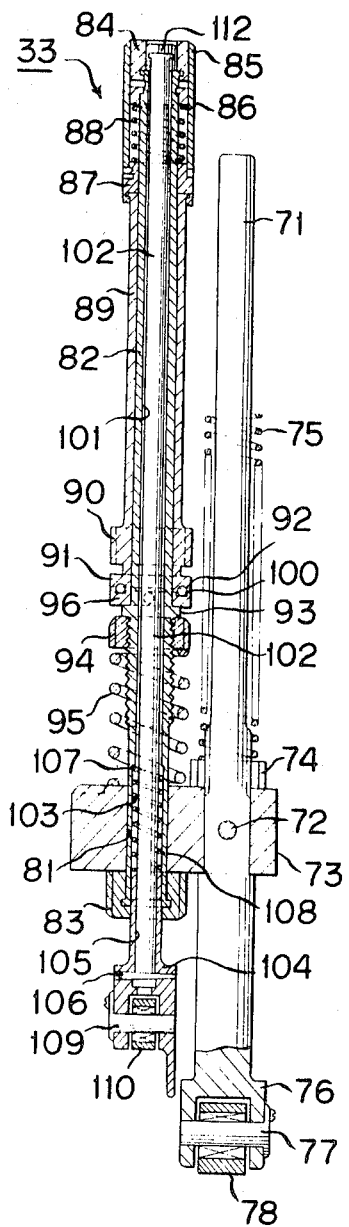
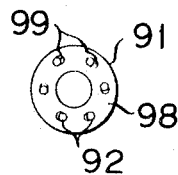
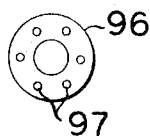

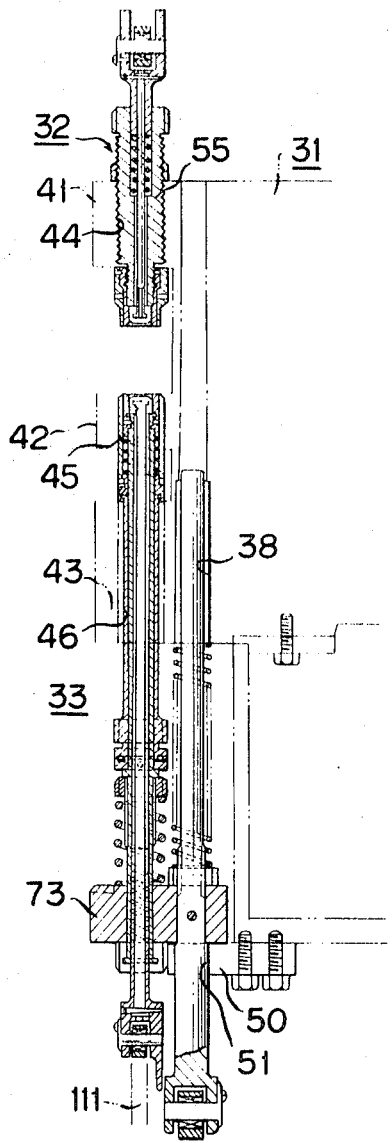

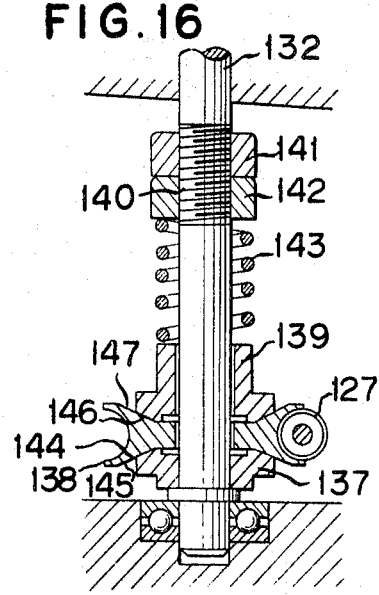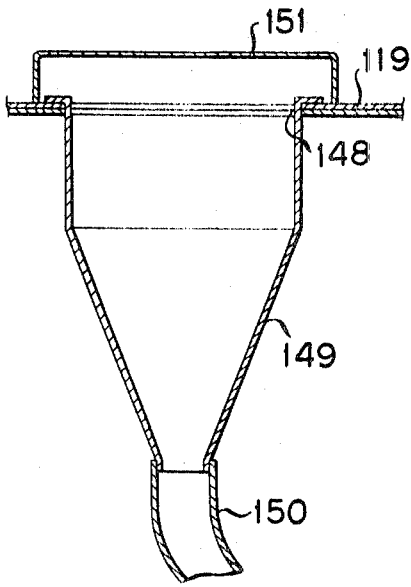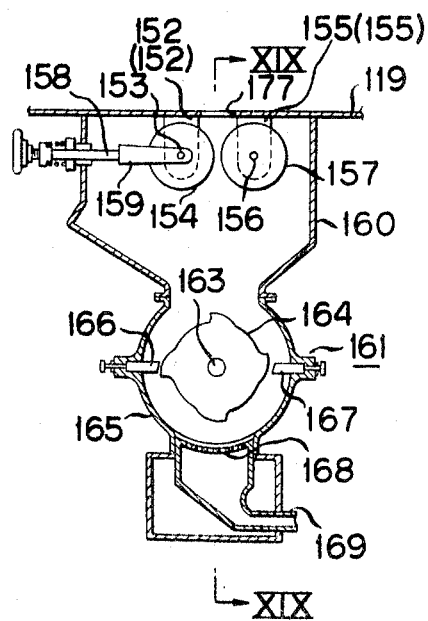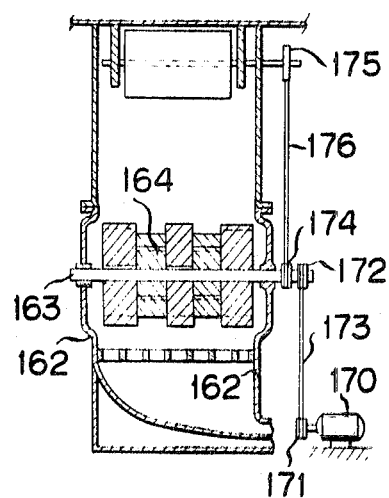

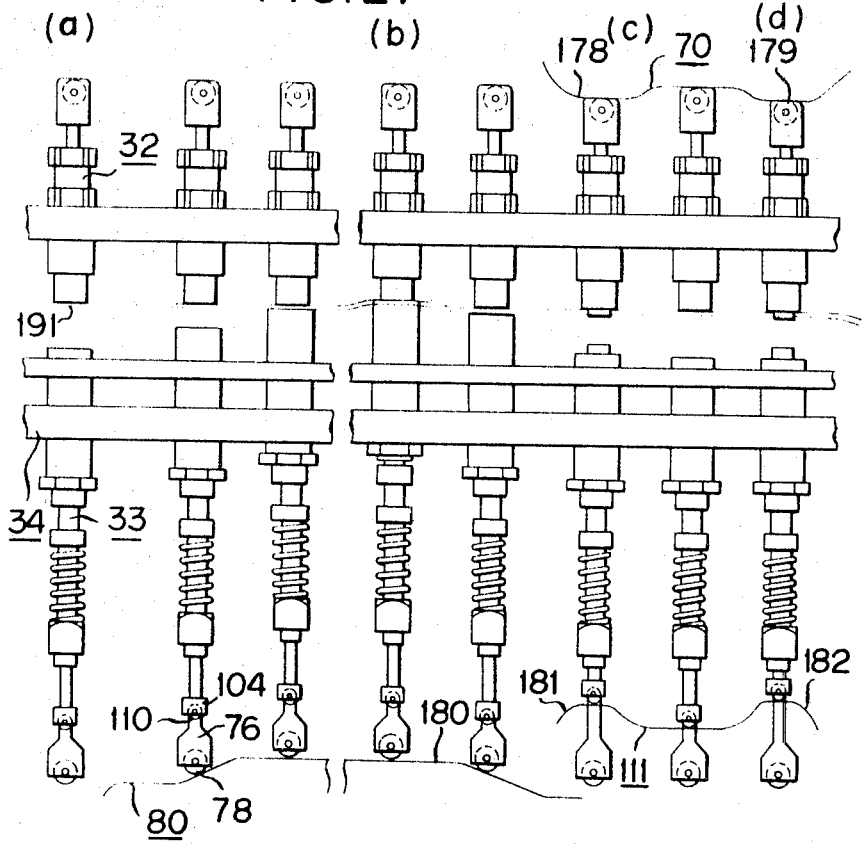
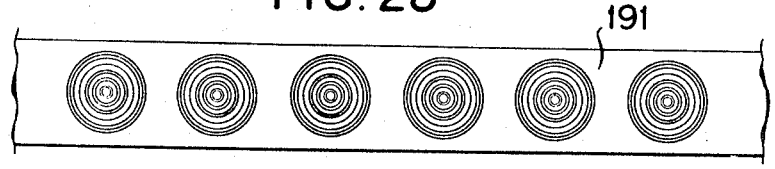
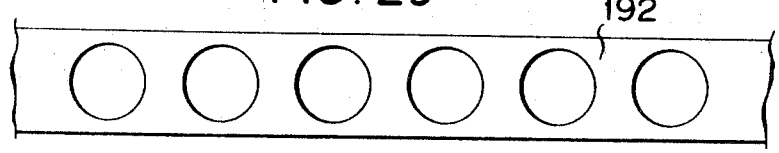

United States Patent Office 3,621,517
Patented Nov. 23, 1971

3,621,517
APPARATUS FOR PRODUCING THERMOPLASTIC RESIN MOLDINGS
Isamu Nishikawa and Shigeo Tasaka, Kyoto-shi, Japan, assignors to Toyo Pafuto Company Limited, Kyoto-shi, and Mitsubishi Petrochemical Company Limited, Tokyo-to, Japan
Filed Nov. 4, 1968, Ser. No. 773,099
Claims priority, application Japan, Nov. 8, 1967, 42/94,226; Nov. 13, 1967, 42/95,541
Int. Cl. B29c 3/00
U.S. Cl. 18—20 C
11 Claims

ABSTRACT OF THE DISCLOSURE

An apparatus, of rotating type, for producing thermoplastic synthetic resin moldings automatically and at high speed comprises introducing the thermoplastic synthetic resin strip material, which has been plasticized in a moldable state, into a molding machine, pressing the strip at a predetermined position between a plurality of upper and lower molds mounted on a rotating base of the molding machine, molding the material at the mold surfaces of the upper and lower molds during rotation of the rotating base, and cutting the material into a predetermined shape by means of a cutting mechanism provided on the upper and lower molds so as to obtain desired products.

BACKGROUND OF THE INVENTION

For molding crown disks, packings, buttons, plate-like articles and similar products with thermoplastic synthetic resins as the material, theretofore, there have been mainly used an injection molding process and a sheet molding process. In the latter, the thermoplastic synthetic resin is first molded and set into a sheet form and then heated for molding into a desired form by means of mold patterns.

The injection molding is naturally a so-called batch system operation wherein a large number of products are divided into several smaller batches and the same operations are repeated, so that it is not a continuous mass production system. It follows that, when a vast quantity of products are to be produced, the production efficiency is low, and the production at any time is not in a stationary state.

In injection molding, when a large quantity of products are to be produced in a stationary state, the thickness of the product is limited to an order of from 0.5 mm. to 0.8 mm. as minimum values. Thus this injection molding process cannot be applied as a method for producing products having a portion where the thickness is 0.5 mm. or below, thereby limiting the cost reduction of the product, and which also restricts the design and the appearance.

The sheet molding method comprises usually the steps of first forming and setting thermoplastic synthetic resin material into a sheet or plate, and reheating the sheet, thereafter pressing it by molds, or molding by means of vacuum suction. Thus the sheet molding method requires such steps as extruding of the sheet material from an extruder, molding of the material which is a process separate from the extruding of the sheet material, transferring of the sheet material to the product molding process, and heating of the sheet material, etc. Thus this method is not suitable for producing, automatically, a vast quantity of products at high speed, and is not satisfactory for molding products having a highly precise form, accurate dimension and an ability of molding at higher speeds.

SUMMARY OF THE INVENTION

The present invention provides an entirely novel method and apparatus for producing a vast quantity of products continuously and successively, which comprises the steps of drawing a seamless strip, continuously delivered from an extruder, into a molding machine while the strip has plasticity, causing engagement of the strip between a number of upper and lower molds mounted on the rotating base of the molding machine, molding the strip material into a desired form by means of the upper and lower molds, and cutting the molded material into a desired shape by cutting mechanism provided on the upper and lower molds, whereby the desired products are separated.

The main object of the present invention is to produce a vast quantity of relatively small-sized synthetic resin molded products continuously and incessantly with high speed, by introducing the thermoplastic synthetic resin strip material, which has been plasticized in a moldable state, into the molding machine proper.

Another object of the present invention is to provide a means for molding which produces a large quantity of products as compared with the scrap, by using only that quantity of blank material which is necessary and sufficient, without requiring a quantity of blank material larger than necessary.

A further object of the present invention is to provide a means which, when a product having a predetermined shape is cut and separated from the sheet strip, no defective product is produced therefrom.

Still a further object of the present invention is to provide a means for preventing damage from occurring in the molds by providing a mechanism which provides a buffering effect in the operation of upper and lower molds, as the sheet material is pressed by the upper and lower molds mounted on the rotating base, whereby the life of the machine and the equipment thereof is prolonged and accidental damage of the machine may be eliminated.

Still another object of the invention is to provide a means for cooling the synthetic resin sheet material, till it reaches a temperature appropriate for separating the products, by the time the material reaches a position at which the products are separated.

Another object of the invention is to provide a means in which once a blank material is fed into the molding machine proper, the finished products can be collected without requiring any assistance, so that the products are hygienic because no hand touches them.

Still a further object is to provide a means for effecting rapid opening and closing of upper and lower molds mounted on the rotating base.

Still another object is to make easy the maintenance, inspection and exchange of all parts of the apparatus, and especially to facilitate the exchange of the molds.

The other object of the invention is to provide means through which each of the machine parts may be adapted for changes in molding requirements.

A particular object of the invention is to provide means by which small-sized synthetic resin products such as crown disks, circular articles, plate-like articles or the like, especially those which require higher precision, may be produced fully automatically, incessantly and in a stable condition at high speeds, so as to obtain a high productivity and to lower the cost of production.

Again the object of the invention is to produce, at higher rate, synthetic resin moldings having extremely thin portions with remarkably high precision.

Furthermore, it is an object of the present invention to provide a means which is adapted to mold products in which extremely thin portions thereof are brought adjacent to thick-walled portions.

Still another object of the invention is to provide a method of molding in which the processes for molding carried out in the molding machine are always in a stationary state at any position.

A further object is to provide a means for treating the scrap material continuously after the products are separated.

BRIEF DESCRIPTION OF THE DRAWINGS

FIG. 1 is a general arrangement of the apparatus according to the present invention, FIG. 2 is a plan view showing a die which can be angularly adjusted and mounted on the extruder, FIG. 3 is a longitudinal section of the same die, FIG. 4 is a side elevation, partly broken away, of the molding machine proper, FIG. 5 is an axial or longitudinal section of the molding machine proper, FIG. 9 is a sectional view showing the upper mold, FIG. 10 is a sectional view of the lower mold, FIG. 11 is a view showing a relative position of the upper mold and the lower mold, FIG. 12 is a bottom view showing an annular flange portion formed on the lower end of an outer pipe rod of the lower mold, FIG. 13 is a view showing an upper surface of a receiving member of the lower mold, FIG. 16 is a sectional view showing essential parts of a driving mechanism rotating the rotor, FIG. 17 is a view showing a product collecting mechanism, FIG. 18 is a view explaining a receiving and crushing device for belt-form scrap, FIG. 19 is a sectional view taken along the line XIX—XIX in FIG. 18, FIG. 27 is an elevation view explaining the molding processes, FIG. 28 is a plan view showing the strip sheet material in the molding process, and FIG. 29 is a plan view of the scrap belt.

DESCRIPTION OF THE PREFERRED EMBODIMENT

Figure 6:
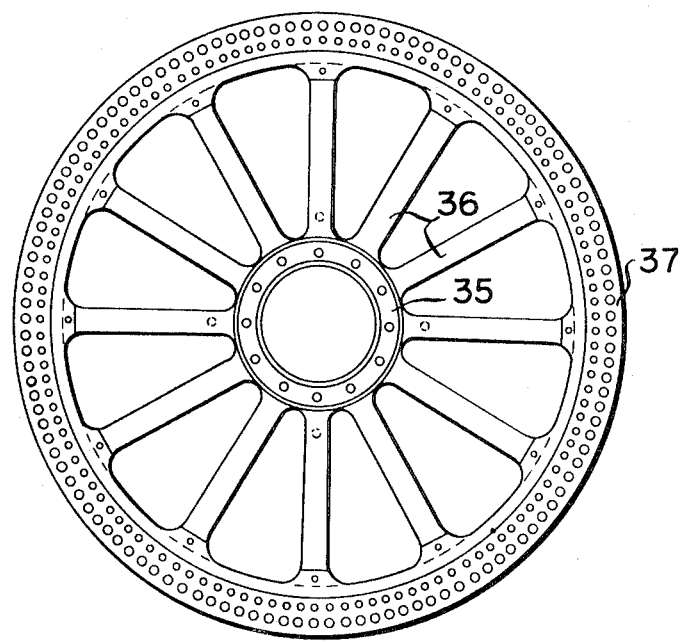
FIG. 6 is a plan showing a rotating base.

The present invention is described with an example referring to the drawings.

The apparatus according to the present invention comprises a plasticizing means, for example, an extruder A, adapted to knead and melt a thermoplastic resin material such as polyethylene, polypropylene, etc., and to supply a seamless strip of sheet material continuously and incessantly, and a molding machine proper B provided adjacent to the plasticizing means, for example, the extruder A (refer to FIG. 1).

The extruder A is of an electric heater type for effecting an accurate temperature control, in which a band heater is mounted on the cylinder barrel. A die therefore comprises a relatively long passage cylinder and a replaceable mouth piece, and is provided with a angularly adjusting mechanism adapted to angularly adjust the die horizontally with respect to the extruder proper.

The molding machine B is rotatable around a central supporting pillar mounted on the machine base, and comprises a rotor mounting a plurality of upper and lower molds on the external periphery of a rotating base, a driving means for the rotor, mold actuating means for opening and closing the upper and lower molds, a cooling mechanism, cutting mechanism mounted on the upper and lower molds, push rod actuators for the molds, a product collecting means and a scrap receiving and crushing means.

EXTRUDER

The extruder A has a screw having a diameter of 115 mm., and its $L/D$ ratio is equal to 25. The mouth piece 2 mounted on the tip end of the die 1 has a lip width of 60 mm. and a lip gap of 1 mm. An adapter 3 of the extruder and the mouth piece 2 at the tip end of the die 1 are connected with a relatively long passage cylinder 4. Around the passage cylinder 4 is provided a band heater 5 to prevent the lowering of the resin temperature. The base portion of the passage cylinder 4 is adapted to form the center of angular adjustment, to properly feed the sheet-formed moldable resin strip, extruded continuously from mouth piece 2, between upper and lower molds at a predetermined angular position, these molds being mounted on the rotating base of molding machine B. This is effected by angularly adjusting die 1 horizontally, whereby the seamless sheet material is fed substantially tangentially to the molds mounted on the periphery of the rotating base. The angularly adjusting mechanism of die 1 is constructed and arranged that no loosening of the clamping means and no leakage of liquid can occur.

For this purpose, the angularly adjusting mechanism is constituted as follows. As shown in FIGS. 2 and 3, an intermediate receiver 7 is secured on the adapter 3, fixed on the extruder A, by means of bolts 6, 6. On the upper surface of a receiving portion 8, formed on the upper portion of the intermediate receiver 7, there is centrally provided a fitting recess 10 connected with a resin passage 9 and having a larger diameter than that of the resin passage 9. Together therewith, an annular groove 11 concentric with the fitting recess 10 is provided, the lower surface of the receiving portion 8 being made as an annular surface 12 which is inclined upwardly and outwardly. Next, an intermediate fitting member 13 is provided, on which is mounted the relatively long passage cylinder 4 having the mouth piece 2 fixed at the tip end thereof. The intermediate fitting member 13 is provided with a curved resin passage 9, and is formed with a beveled portion 14 at the lower end thereof, and with a downwardly extending cylindrical portion 15 having extending centrally therethrough resin passage 9. The upper surface of the beveled portion 14 is formed as an annular inclined surface 16 having an outwardly and downwardly inclined surface as in the case of the annular inclined surface 12. Cylindrical portion 15 is freely and closely fittable into fitting recess 10, and annular inclined surfaces 12, 16 are opposed to each other so as to present annular tapered portions. The cylindrical portion 15 of the intermediate fitting member 13 is fitted into the fitting recess 10 of intermediate receiver 7, the lower surface 17 of the intermediate fitting member 13 is made to abut on the upper surface 18 of the intermediate receiver 7, and the assembly is secured by means of a clamp 19.

Clamp 19 comprises a plurality of clamp elements 21 articulated to each other by pins 20. The clamp elements 21 at the free ends of clamp 19 are formed laterally with notches 22, and the arcuate inner edges of the four clamp elements are tapered to provide inclined surfaces 23 and 24, the taper extending radially. The inclined surfaces 23 and 24 abut annular inclined surfaces 12 and 16 of intermediate receiver 7 and intermediate fitting member 13, respectively. Clamp 19 is tightened by means of a bolt 25 extending through notches 22 and having a clamping nut threaded thereon. Thereby, intermediate fitting member 13 can be angularly adjusted by loosening clamp 19, followed by adjusting the intermediate fitting member 13 with respect to the intermediate receiver 7.

Such an angularly adjusting mechanism is quite convenient and effective to prevent the resin from leaking, because the control of clamping condition, that is, the excessive clamping or loosening of the clamping due to thermal expansion of the intermediate receiver 7 or the intermediate fitting member 13 due to increase in temperature by commencement of the extrusion, can be effected by adjusting the bolts 25 and nuts 26 during operation without stopping the apparatus. Furthermore each of the annular inclined surfaces 12, 16 of the intermediate receiver 7 and the intermediate fitting member 13 are clamped by inclined surfaces 23, 24 of the clamp 19, so that there is no possibility of loosening of clamp at the thermal expansion, nor leakage of resins. At the contracted state, too, no loosening of the clamp will ever occur thanks to the mutual intimate holding action of the inclined surfaces, so that members are well adapted for any condition.

The molten resin strip, which is fed to the molding machine B as extruded continuously from the extruder A, contacts with the external atmosphere, and the temperature thereof decreases slightly from the temperature immediately after the extrusion, but the strip is still in a sufficiently moldable state in both its transversal and longitudinal directions. When the strip is engaged with the upper and lower molds mounted on the rotating base of the molding machine proper B, it is so arranged that the strip is caused to stretch in the longitudinal direction. However, if the strip is stretched too much, the molecules thereof tend to orient themselves, which is not appropriate because there will be caused a change in contractions in transversal and longitudinal directions when the products are cooled.

MOLDING MACHINE PROPER

Figure 7:
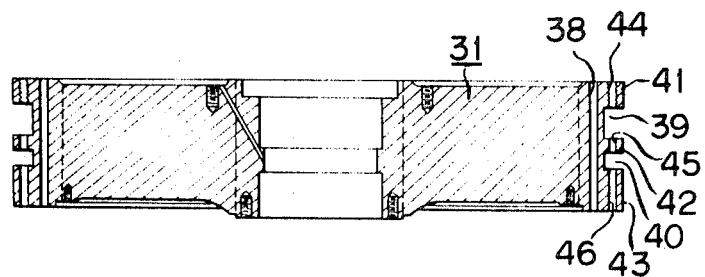
FIG. 7 is a diametric section of the rotating base.
Figure 8:
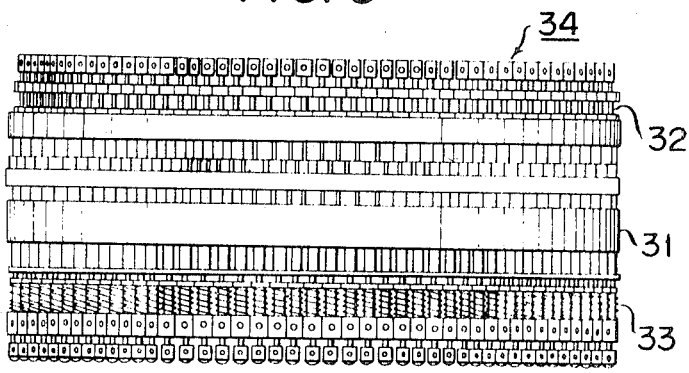
FIG. 8 is a side view of the rotor in which upper molds and lower molds are mounted on the rotating base.

The molding machine proper B and the extruder A are arranged in sequence. As shown in FIGS. 4 and 5, the molding machine proper B has the rotating base 31 rotatably mounted on a supporting pillar 28, arranged at the central portion of the machine base 27, through thrust bearings 29, 30. On the periphery of the rotating base 31 are mounted a number of upper molds 32, at predetermined spacings and respective lower molds 33 are arranged opposite each upper mold 32. This forms a rotor 34 which mounts a large number of upper molds 32 and lower molds 33 on the periphery of the rotating base. As shown in FIGS. 6 and 7, the rotating base 31 is provided with radial ribs 36, 36, extending from a boss 35 so that the base has sufficient strength yet a weight as light as possible and easiness in rotation. A peripheral mold mounting portion 37 the outer ends of the ribs 36, 36. Mounting portion 37 is formed with longitudinal holes 38 for sliding an actuating shaft, and on the outer periphery there are formed an upper annular groove 39 and a lower annular groove 40, which define an upper mold mounting portion 41, lower mold guiding portion 42, and lower mold mounting portion 43. The upper mold mounting portion 41 has vertically oriented upper mold mounting threaded holes 44 at predetermined spacings. The lower mold guiding portion 42 has vertically oriented guide holes 45, 45. The lower mold mounting portion 43 has vertically oriented lower mold sliding holes 46, 46.

As shown in FIG. 5, on the lower face of the rotating base 31, a supporting ring 48 is suspended by means of bolts 47, 47, and a guiding annular plate 50 is secured to the supporting ring 48 by means of bolts 49, 49, 50 having vertically oriented guide holes 51 for actuating shafts extending vertically. Actuating shaft sliding holes 38 and the actuating shaft guiding holes 51 are so arranged that they have a common axis; upper mold mounting threaded holes 44, lower mold guiding holes 45 and the lower mold sliding holes 46 are also arranged to have a common axis.

The upper molds 32 and the lower molds 33 are constructed as follows:

The lower part of a bifurcated head 54, rotatably mounting a roller 53 on the short shaft 52, of the upper mold 32, is inserted into an upper longitudinal hole 56 of the supporting cylinder 55 as shown in FIG. 9, and a nut 58 is screwed on the external threaded portion 57 of cylinder 55. A die 60 is screwed on a small-diameter threaded portion 59 of the supporting cylinder 55, and an outer die 61 is fitted over the outer periphery of die 60. A push rod 64 is inserted through a longitudinal hole 62 of the bifurcated head 54 and a sliding hole 63 of the supporting cylinder 55, and is fixed to the bifurcated head 54 by a pin 65. A spring 66 is provided around the push rod 64 between the bottom face of the upper longitudinal hole 56 and lower face of the bifurcated head 54. An inner die 67 is fixed at the lower end of the push rod 64 protruding from small-diameter threaded portion 59, inner die 67 being adapted to slide freely along the inner peripheral surface of die 60. By screwing the supporting cylinder 55 of the upper mold 32 into the upper mold mounting threaded hole 44 provided in the upper mold mounting portion 41 of the rotating base 31, the upper mold 32 is mounted on the upper mold mounting portion 41. The upper surface of the outer die 61 of the die 60 is engaged with the lower surface of the upper mold mounting portion 41, and the upper mold 32 is secured on the upper mold mounting portion 41 by clamping the nut 58 on the upper surface of the upper mold mounting portion 41 (FIG. 11).

As shown in FIG. 5, the roller 53 of the upper mold 32 is engaged with the lower surface of an upper mold guide rail 70, for actuating the push rod, and which is fixed by bolts 69, 69 on the lower surface at the periphery of a top cover 68 secured at the upper end of the supporting pillar 28.

The lower mold 33 is so formed as to be movable up and down through an actuating shaft 71 as shown in FIG. 10. The upper portion of the actuating shaft 71 is inserted into the actuating shaft sliding hole 38 of the rotating base 31, the lower portion is inserted into the actuating shaft guide hole 51 of guiding annular plate 50, and a supporting member 73 is fixed by means of a pin 72 on the actuating shaft 71. The lower surface of the supporting member 73 is made to abut the upper surface of guiding annular plate 50. A nut 74, screwed on the actuating shaft 71, clamps the shaft and a spring 75 is mounted on the actuating shaft 71 at a portion above said nut 74. The upper end of the spring 75 is engaged with the lower surface of the lower mold mounting portion 43, and the lower end thereof is engaged with nut 74. A bifurcated portion 76 at the lower end of the actuating shaft 71 rotatably mounts a roller 78 by a short shaft 77. The roller 78 is placed on a guide rail 80, for the actuating shaft, and which is secured on a supporting portion 79 of the machine frame 27.

Another guide hole 81 extends vertically through supporting member 73 fixed on the actuating shaft 71 by a pin 72, and the lower mold 33 is mounted with its lower portion inserted through the guide hole 81, and with its upper portion inserted through the lower mold sliding hole 46 while, at the same time, its upper end is fitted into the lower mold guide hole 45 (see FIG. 11). More particularly, the mounting of the lower mold 33 is effected by inserting an inner pipe rod 82 through guide hole 81 of the supporting member 73, fixing the inner pipe rod 82 on the supporting member 73 by means of a stopper 83, fixing a die 84 at the top portion of the inner pipe rod 82, providing a sliding cylinder 86 formed with a blade 85 at the upper edge thereof, on the outer periphery of the die 84, fixing a connector 87 at the lower end of the sliding cylinder 86, and fitting a spring 88 around the inner pipe rod 82 between the upper surface of the connector 87 and the lower surface of the die 84.

Further, an outer pipe rod 89 is slidably fitted on the outer periphery of the inner pipe rod 82 with the upper end of the outer pipe rod 89 fixed on connector 87. The lower portion of the outer pipe rod 89 is formed with a ratchet portion 90 and, below the ratchet portion 90, there is provided an annular flange 91. The lower face of this annular flange is formed with semispherical recesses 92, 92 at equal spacing (see FIG. 12).

A nut 94 is screwed on a threaded portion of the inner pipe rod 82 below a flange portion 93 formed on the inner pipe rod 82 below the portion where the outer pipe rod 89 is fitted, and a spring 95 is fitted on the inner pipe rod 82 between the lower surface of the nut 94 and the upper surface of the supporting member 73. A receiving member 96 is fitted around the inner pipe rod 82 and fitted onto a central flange portion. On the upper surface of the receiving member 96 there are provided semispherical recesses 97 (as shown in FIG. 13), and the recesses 92, 92 on the lower surface of annular flange 91 are formed with sloped portions 99, 99 curving and sloping towards the lower surface 98. Between the recesses 92 formed on the lower surface 98 of the annular flange portion 91 at the lower end of outer pipe rod 89 and the recesses 97 formed on the upper surface of the receiving member 96, there are inserted steel balls 100, 100.

A push rod 102 extends through the interior 101 of inner pipe rod 82, and the upper portion of a bifurcated roller support member 104 is inserted into a large diameter portion 103 at the lower portion of the hole 101. The lower end of the push rod 102 is inserted into the longitudinal hole 105 of the supporting member 104, and is fixed with a pin 106. A spring 108 is mounted on the push rod 102 between the upper end surface of the bifurcated roller supporting member 104 and a shoulder 107 at the upper end of the large diameter portion 103.

The bifurcated roller supporting member 104 rotatably supports a roller 110 on a short shaft 109. This roller 110 is placed on the upper surface of the push rod operating guide rail 111 secured on the upper surface of a supporting portion 79 of the machine base 27, and an inner die 112 is fixed on the upper end of the push rod 102 and protrudes upwardly from the inner pipe rod 82.

Thus, a mechanism for relative actuation of the upper and lower molds is formed so that a desired molding can be carried out, by arranging the die 60, mounted on the upper mold 32, outer die 61, inner die 67, the die 84, mounted on the lower mold 33, and inner die 112 as described above. A cutting mechanism is also formed by the outer peripheral lower edge of the outer die 61 of the upper mold 32 and blade portion 85 at the upper edge of the sliding cylinder of the lower mold 33.

Figure 14:
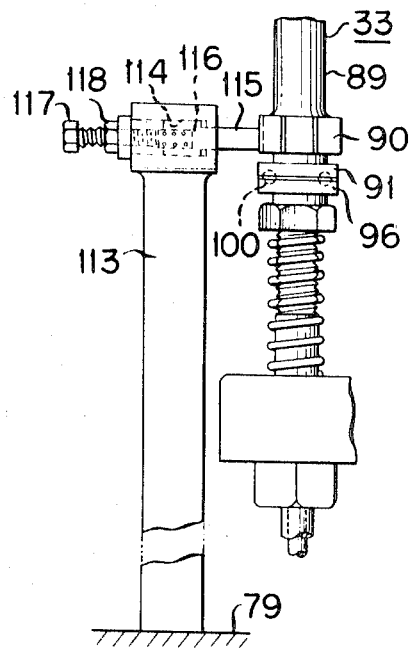
FIG. 14 is a view showing the operation of an engaging piece of a cutting mechanism.
Figure 15:
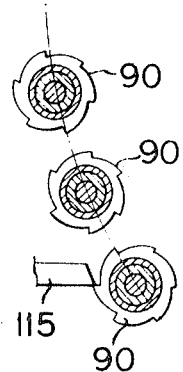
FIG. 15 is a view showing a position in which the cutter of the lower mold is raised by means of the engaging piece.

The cutting mechanism will further be described in detail referring to FIGS. 14 and 15.

A supporting member 113 is provided on the supporting portion 79 and is spaced radially from the boss portion of the machine base 27, and a lateral hole 114 is formed on the upper portion of the supporting member 113. A cross rod 116, formed with an engaging piece 115 at one end, is passed through lateral hole 114.

Engaging piece 115 is caused to protrude towards the mold track of rotor 34, and is made to engage with the ratchet portion 90 formed at the lower portion of the outer pipe rod 89 of lower mold 33. Furthermore, to make the lateral rod 116 adjustable forwardly and backwardly, an adjusting bolt 117 and a lock nut 118, or the like, are provided thereon. In this case, as shown in FIG. 15, the engaging piece is so adapted that the outer pipe rod 89 itself rotates when the ratchet portion 90, formed at the lower portion of the outer pipe rod 89 of the mold 33 rotating with the rotor 34, is engaged with the engaging piece 115, and the engaging piece 115 disengages ratchet portion 90 when the lower mold 33 makes a slight rotation.

The cutting mechanism further operates as follows: When the ratchet portion 90 of the outer pipe rod 89 is engaged with engaging piece 115, the outer pipe rod 89 is caused to rotate by means of the ratchet portion 90, rotating the annular flange portion 91 at the lower end of the outer pipe rod 89 therewith. The sloped portions 99, 99 rollingly ascend on the steel balls 100, 100 inserted between the recesses 92, 92 of the annular flange portion 91 and the recesses 97, 97 of the receiving member 96, so that the bottom surface of the annular flange portion 91 and the top portions of the steel balls 100, 100 are in contact.

Thus, when balls 100, 100 contact with the bottom face of the annular flange portion 91, the outer pipe rod 89 rises while making a rotation, moving the sliding cylinder 86 upwardly by compressing the spring 88 through the connector 87 provided at the upper end of the outer pipe rod 89, and the upper portion of the sliding cylinder 86 protrudes over the upper face of die 84. By this movement, the blade portion 85 is engaged with the lower end of the outer die 61 of the upper mold 32, and a rotary shearing is effected by the outer die 61 of the upper mold 32 and the sliding cylinder 86.

The upper mold 32 and the lower mold 33 thus form a molding mechanism as well as a cutting mechanism.

After the outer pipe rod 89 has rotated upwardly, and when the annular flange portion 91 has passed over the tops of the steel balls 100, 100, the steel balls 100, 100 return between the recesses 92 and 97 by the action of the spring 88, the outer pipe rod 89 is restored to its original state, and the sliding cylinder 86 also returns to its original state therewith.

The said upper mold 32 and the lower mold 33 further provide a pushing mechanism.

The bifurcated head 54 moves downwardly, together with the push rod 64 which is formed integrally therewith, against the elastic force of the spring 66 when the roller 53 is brought onto the projected portion of the guide rail 70 fixed on the top cover 68, and the relation of parts is such that the inner die 67, mounted at the lower end of the push rod 64, is made to project beyond the die 60.

The pushing mechanism of the lower mold 33 lifts the push rod 102, together with the supporting member 104, against the elastic force of the spring 108 when the roller 110 arrives at a convex portion 181 of a guide rail 111 fixed on the supporting portion 79 of the machine base 27, so that the inner die 112 at the top end of the push rod 102 is projected beyond the die 84 so as to effect the pushing action.

In this manner, when moldings adhere to the die 60, outer die 61, or inner die 67 of the upper mold 32, the moldings are pushed down by means of the push rod 64 acting through the inner die 67, and when the moldings adhere to the die 84 or the inner die 112 of the lower mold 33, the moldings are pushed up by means of the push rod 102 to remove the moldings.

A cooling means is provided to supply an air current or a cool wind around the rotor 34 to cool the upper mold 32, lower mold 33, and the molten sheet material during the molding of synthetic resin molten sheet material, engaged between the upper mold 32 and the lower mold 33, by means of the upper mold 32 and lower mold 33 at a predetermined position of the rotor.

Figure 26:
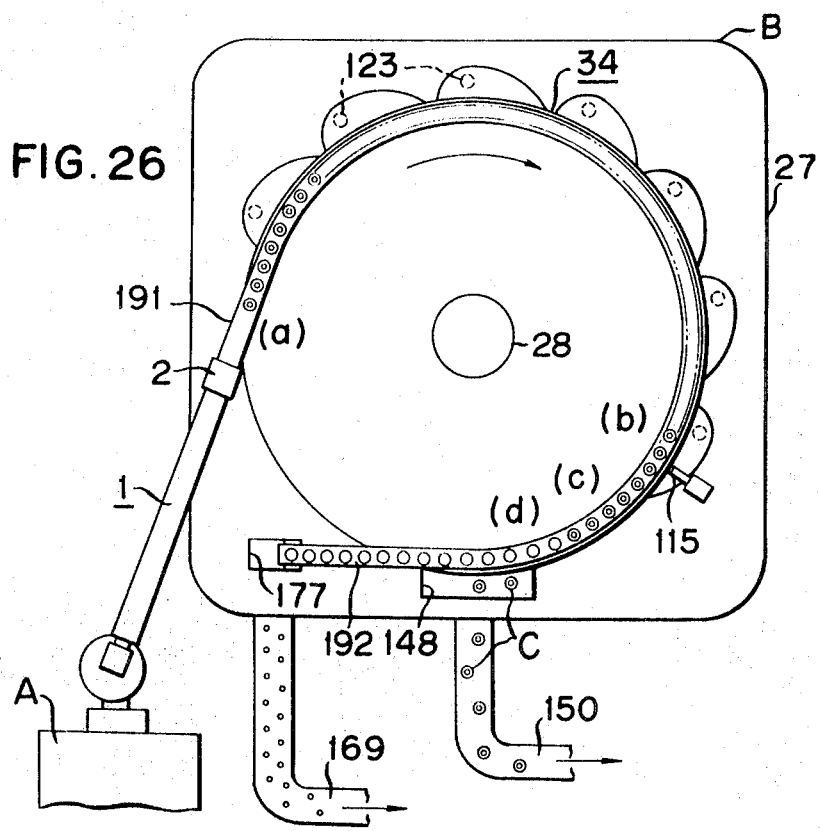
FIG. 26 is a general arrangement for explaining the method of molding according to the present invention.

Namely, as shown in FIGS. 5 and 26, a number of air guide covers 120 are provided around the rotor 34, on the upper plate 119 of the machine base 27, and air supplied from electric blowers 121, 121 arranged in the machine base 27, is blown from nozzles 123, 123, opening into covers 120, through conduit pipes 122, 122 so as to cool the rotor 34 as well as the upper mold 32, and lower mold 33. The upper mold 32, the lower mold 33 and the moldable sheet material are thus cooled as the sheet material is molded by the upper mold 32 and the lower mold 33. As the rotor 34 rotates, the sequence is such that the molded portion arrives at the cutting position in a state appropriate for cutting the molded portion from the sheet material which has been engaged between and molded by the upper mold 32 and the lower mold 33.

The mechanism driving rotor 34 is constituted as follows:

As shown in FIG. 5 and FIG. 16, a motor 124, a clutch, a stepless speed changer, and a reducer (not shown) are provided in a space under the machine base 27. A chain 129 extends over a sprocket 126 fixed on the reducer shaft 125 and a sprocket 128 fixed on a worm shaft 127, so that worm shaft 127 is rotated by driving the motor 124. A driving shaft 132 extends through the supporting portion 79 of the machine base 27 and through a vertical hole 131 of a driving shaft support secured on the supporting portion 79. A gear 133 is secured at the upper projecting end of the driving shaft 132, and a gear 134 is fixed on the lower surface of the boss of said rotating base 31. Gear 133 engages with the gear 134.

Furthermore, the lower portion of the driving shaft 132 is supported by a thrust bearing 136 mounted on the supporting base 135. On the driving shaft 132, a lower friction member 137, a worm wheel 138, and an upper friction member 139 are fitted around above the thrust bearing 136. Adjusting nuts 141, 142 are screwed on an intermediate threaded portion 140 of the driving shaft 132, and a spring 143 surrounds driving shaft 132 between the upper friction member 139 and the adjusting nut 142. The lower friction member 137 is fixed on the driving shaft 132, the worm wheel 138 is loosely fitted on the driving shaft 132, and the upper friction member 139 is slidably fitted on the driving shaft 132. The annular upwardly inclined surface 144 of the lower friction member 137 and the annular inclined surface 145 of the worm wheel 138 are made to mate closely, and similarly, the annular downwardly inclined surface 146 of the upper friction member 139 and the annular inclined surface 147 of the worm wheel 138 are made to mate closely. The friction clutch parts are so arranged that the upper friction member 139 abuts the worm wheel 138 by means of the elasticity of the spring 143, and worm wheel 138 is placed between the upper friction member 139 and lower friction member 137, worm wheel 138 being engaged with worm shaft 127.

In this case, the spring 143 is so arranged that it is made adjustable, to expand and contract in the vertical direction by adjusting the nuts 141, 142.

Thus by actuating the electric motor 124, the worm wheel shaft 127 is rotated, and the driving shaft 132 is rotated through the upper friction member 139 and lower friction member 137. When an overload is applied onto the rotor 34, etc., and unexpected stopping of operation results, slips are produced between the inclined surface 145 of the worm wheel 138 and the inclined surface 144 of the lower friction member 137 as well as between the inclined surface 147 of the worm wheel 138 and the inclined surface 146 of the upper friction member 139 against the pre-adjusted elastic force of the spring 143, so that the driving shaft 132 is never forced to rotate with the rotation of the worm wheel 138. Accordingly damage due to overload on the motor 124, reducer, or the other driving mechanisms, and application of unnecessary torque on each of the mechanisms operating through the driving shaft 132, can be prevented.

Such a driving mechanism assures the safety of the apparatus.

On one side of the upper plate 119 of the machine base 27, a product delivery port 148 is provided, and below this delivery port 148, there is provided a hopper 149. A transfer pipe 150, with its one end opening into the hopper 149 and with the other end connected to a cyclone for the products (not shown) forms a product collecting mechanism (FIGS. 1 and 17).

The delivery port 148 is covered with a cover 151. Products are cut from the molded sheet material by the cooperation of the upper mold 32 and lower mold 33 of the rotor 34, and the delivery port 148 is positioned at a zone where the products are removed from the lower mold 33 or the upper mold 32 by means of the pushing mechanisms. The separated products are transferred by vacuum, to the product cyclone, through the transfer pipe 150.

A scrap take-up mechanism is provided on the advancing side of the rotor 34 relative to delivery port 148.

The scrap take-up mechanism has a rubber roll 154 mounted on the shaft 153 supported by supporting members 152, 152 extending perpendicular to the upper plate 119 of the machine base 27, as shown in FIGS. 1, 18 and 19, and similarly, a knurled roll 157 is mounted on a shaft 156 supported by supporting members 155, 155 extending perpendicular to the upper plate 119, the rubber roll 154 at one side being confronted elastically and detachably with knurled roll 157 through a rod 159 fixed to the tip end of a threaded bolt 158.

Below rubber roll 154 and the knurled roll 157, there is provided a crushing mechanism 161 connected beneath a case 160. The crushing mechanism 161 has five sets of four-bladed rotating cutters 164 mounted on a rotating shaft 163 supported, on both ends, by side panels 162, 162, each cutter of the set being fixed on the shaft with blades phase shifted relative to the other cutter. On the opposed walls of a cylindrical case 165, there are provided fixed blades 166, 167 which are adjustable forwardly and backwardly. The bottom portion of the cylindrical case 165 is formed as a screen portion 168. The enlarged portion at the inner end of the transfer pipe 169, whose outer end is introduced into the cyclone for crushed material (not shown), is fixed on screen portion 168. A chain 173 extends over a sprocket 171, fixed on the shaft of a motor 170 mounted in the machine base 27, and a sprocket 172 fixed on the shaft 163. Another chain 176 extends over another sprocket 174, fixed on a shaft 163, and a sprocket 175 fixed on the shaft 156, projecting from the case 160, for knurled roll 157. The belt-form scrap, from which the products molded by the upper mold 32 and lower mold 33 have been removed, is passed between the rubber roll 154 and the knurled roll 157 from a scrap charging port 177 formed in the upper plate 119 of the machine base 27. The scrap is passed between the rotating cutters 164, 164 and fixed cutter 166. Thus, by providing suitable gaps between the rotating cutters 164, 164 driven by the motor 170 and the fixed cutter 166, the scrap belt is taken by the rotating cutter 164, and is crushed by the rotating cutters 164 and the fixed cutter 166. The crushed material of the scrap belt is sucked by vacuum through the screen portion 168 and through the transfer pipe 169 and is delivered into the cyclone (not shown) for the crushed material. The crushed pieces, which although crushed by means of the left-hand fixed cutter 166 are too large to pass through the screen portion 168, are raised up by the rotating cutters 164 and again crushed by means of the right-hand fixed cutter 167 and the rotating cutters 164, and, successfully passing the screen portion 168, are transferred to the cyclone for crushed material. The crushed material transferred to the cyclone may also be supplied again to the extruder A if desired.

Figure 20:
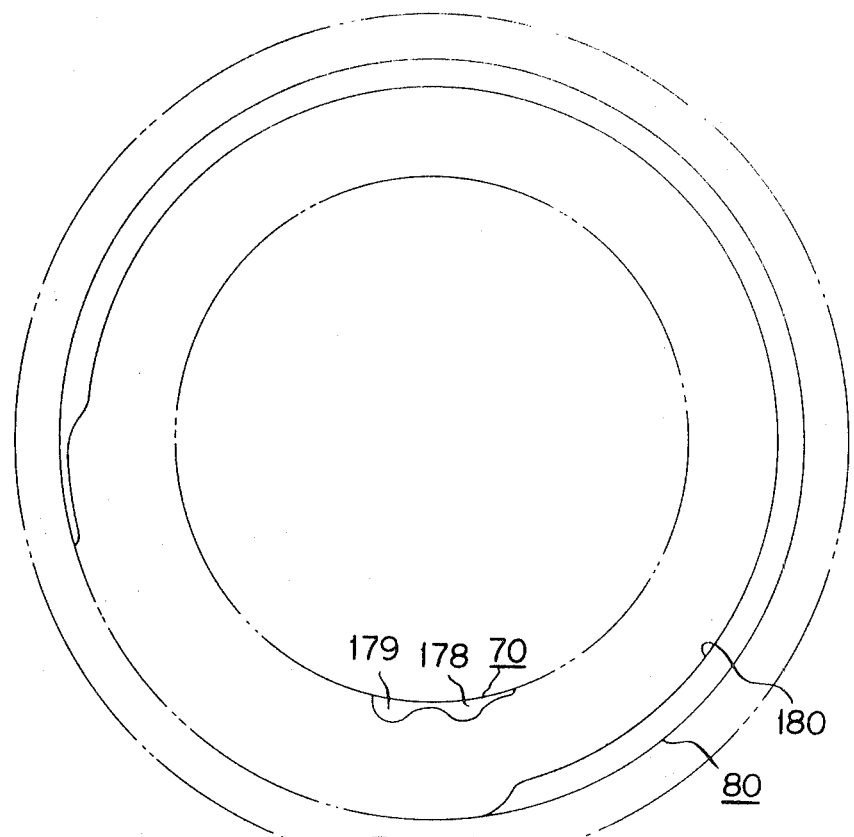
FIG. 20 is a view showing the relative position and arrangement of guide rails.
Figure 21:
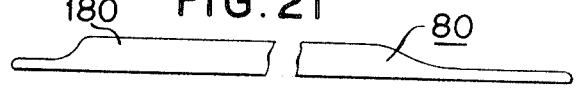
FIG. 21 is a side view of the guide rail for an actuating shaft, shown in a developed state.
Figure 22:
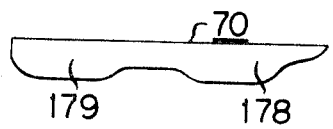
FIG. 22 is a side view of a guide rail for actuating a push rod of the upper mold, shown in a developed state.
Figure 23:
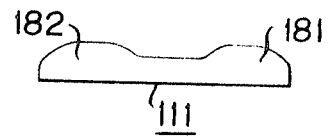
FIG. 23 is a side view of a guide rail for actuating a push rod of the upper mold, shown in a developed state.

Since the upper mold 32, which is fixed on the upper mold mounting portion 41 of said rotor 34, has its supporting cylinder 55 fixed onto the upper mold mounting portion 41, the die 60 and the outer die 61 do not move, but the push rod 64 is operated to push out the inner die 67 mounted at the lower end of the push rod 64. The guide rail 70 is fixed at the lower periphery of the top cover 68. The guide rail 70 operates the push rod 64. Desired moldings are produced from sheet material by means of the upper mold 32 and lower mold 33. The guide rail 70 is formed with downward projections 178, 179 to move the push rod 64 downwardly through roller 53 of the upper mold 32 when the lower mold 33 is separated with respect to the upper mold 32 as shown in FIGS. 20 and 22. The guide rail 80 fixed on the machine base 27 for moving upwardly and downwardly the actuating shaft 71 operating the lower mold 33 is formed with an upward projection 180 which extends for about three quarters of the periphery to move the lower mold 33 upwardly, to engage the sheet between the lower mold 33 and the upper mold 32, to mold, to rotate and thereafter to move lower mold 33 downwardly and separate the lower mold 33, at a predetermined position, from the upper mold 32. The guide rail 111 which moves the push rod 102 of the lower mold 33 upwardly is formed with upward projections 181, 182 at a position approximately corresponding to the downward projections 178, 179 formed on the guide rail 70 of said upper mold 32. When the roller 110 moves upwardly these upward projections 181, 182, the push rod 102 is pushed upwardly, projecting the inner die 112 upwardly from the die 84 of the lower mold 33, thereby pushing up the molded product adhered to the die 84 to separate and remove it therefrom. Guide rail 80 controls the upward operation of the lower mold 33, the guide rail 70 controls the downward operation of the push rod 64 of the upper mold 32, and the guide rail 111 controls the push rod 102 of the lower mold 33.

Figure 24:
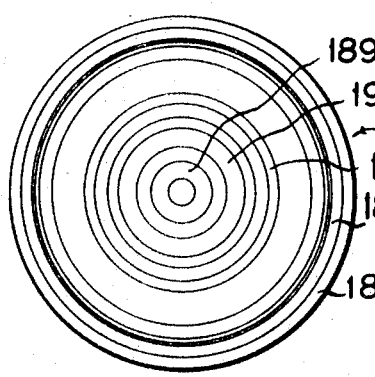
FIG. 24 is a plan view showing an example of a product molded according to the present invention.
Figure 25:
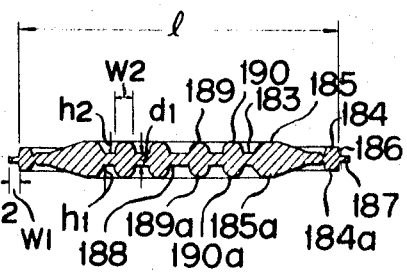
FIG. 25 is a diametric section of FIG. 24.

By means of the extruder A and the molding machine proper B, which is constructed as described, crown disks C shown in FIGS. 24 and 25 are molded, and this will be described in the following referring to FIGS. 26 through 29.

The crown disk C comprises annular rim projections 184, 184a formed on opposite faces of a circular main portion 183, annular projections 185, 185a, a thin peripheral flange portion 187 peripherally provided centrally of a vertical peripheral wall 186, and concentric annular projections 189, 189a, 190, 190a formed on the central portion 188 inside the annular projections 185, 185a. The diameter $l$ of the vertical peripheral wall 186 is 27 mm., the thickness $d_1$ of the main portion 183 is 0.7 mm., the thickness $d_2$ of the thin flange portion 187 is 0.2 mm., and the width of the latter $W_1$ is 0.8 mm. The height $h_1$ from the flat surface at the central portion 188 of the main portion 183 to the top portion of the annular projections 185, 185a is 0.5 mm., the height $h_2$ from the flat surface at the central portion 188 of the main portion 183 to the top portions of each of concentric annular projections 189, 189a, 190, 190a is 0.4 mm. and the width $W_2$ is 1 mm.

Referring to FIGS. 26 through 29, polyethylene resin material is charged into the extruder A, kneading and melting the material, extruding the seamless, gapless and continuous plastic sheet material 191 from the mouth piece 2 of the die 1 continuously, and causing the sheet material 191 to engage between the upper mold 32 and the lower mold 33 mounted on the rotor 34 (refer to the position at $a$ in FIG. 26). In the position $a$ where the sheet material is caused to engage, the lower mold 33 is slightly spaced with respect to the upper mold 32 and the lower mold 33 approaches the upper mold 32. In this way, the sheet material 191 extruded from the mouth piece 2 and engaged between the upper mold 32 and lower mold 33 of the rotating rotor 34 is caused to stretch by the gripping and rotating motion of upper mold 32 and lower mold 33. The extruding speed of the extruder A and the rotating speed of the rotor 34 are so adjusted that no hanging or sagging of the sheet material 191 will occur. The still plastic sheet material 191, gripped between the upper mold 32 and lower mold 33, is pressed and molded into a predetermined shape by means of the die 60, outer die 61, and inner die 67 of the upper mold 32, and the die 84, and the inner die 112 of the lower mold 33. In this operation, the upward motion of the lower mold 33 is effected by the actuating shaft 71. For this purpose, the lower mold 33 is moved upwardly, while using the spring 95 as a buffer, by lifting of the supporting member 73 fixed by the pin 72 on the actuating shaft 71. The actuating shaft 71 is raised against the elastic force of the spring 75, through the sliding, longitudinal hole 38 and the guide hole 51 for the actuating shaft, by the roller 78 and a projected portion 180 of the guide rail 80 fixed on the machine base 27. The die 84 and the inner die 112 of the lower mold 33 are caused to approach to the die 60, outer die 61 and the inner die 67 of the upper mold 32. The actuating shaft 71 will not swing, because it moves upwardly and downwardly through the actuating shaft guide hole 51 of the guide annular plate 50 and the sliding longitudinal hole 38 of the rotating base 31 as guides. Similarly, the lower mold 33, which is moved upwardly by the supporting member 73, can perform a correct movement upwardly and downwardly without swinging, by up and down movement of the actuating shaft 71, which does not swing, with the guide hole 45 of the rotating base 31 and the sliding hole 46 as guides. Furthermore, the matching condition between the upper mold 32 and lower mold 33 is made correctly, and the approach of the die 84 of the lower mold 33 and the inner mold 112 against the die 60 of the upper mold 32, outer die 61 and the inner die 67 is carried out positively at the predetermined position. In the cases where some impurities are contained in the sheet material 191, or when some obstacles are interposed at the matching condition of the upper mold 32 and the lower mold 33, breaking of the upper mold 32 and lower mold 33, or damage of the mechanisms of various parts, can be prevented by the sudden prompt compression of the spring 95. In this case, the clamping force between the upper mold 32 and lower mold 33 can be adjusted by the adjusting nut 94 and the spring 95.

The plastic sheet material 191, gripped between the upper mold 32 and lower mold 33, is transferred with the rotation of the rotor 34 while being molded into the predetermined shape at the predetermined position, and during this process, the upper mold 32, lower mold 33 and the sheet material are cooled by air blown from a delivery port 123 of the cooling mechanism. When the upper mold 32, lower mold 33 and the sheet material 190 arrive at a position $b$ in FIG. 26, while being cooled, the preadjusted cutting mean operates. In the operation of this cutting mechanism, the ratchet portion 90 of the lower mold 33 engages in turn with the projecting engaging piece 115 mounted on the supporting member 113 on the machine base 27, so that the outer pipe rod 89 is rotated. The lower surface of the annular flange portion 91 is transferred on the top portions of steel balls 100, 100 fitted between the semispherical recesses 92 formed on the lower surface of the annular flange portion 91 at the lower end of the outer pipe rod 89 and the recesses 97 of the receiving member 96, through the sloped portions 99, 99 of the annular flange portion 91, and lifts the outer pipe rod 89. The outer pipe rod 89 lifts the sliding cylinder 86 as a unit therewith and causes the blade 85 to project over the upper surface of the die 84, and at the same time operating to fit the blade 85 onto the outer periphery at the lower end of the outer die 61 of the upper mold 32. With the rotation and the vertical movement of the blade 85 of the sliding cylinder 86, the blade 85 rotatingly shears the products C from the sheet material 191, along the profiles of the desired products molded in the sheet material 191, at position $b$ in FIG. 26.

Then the upper mold 32 and lower mold 33 are separated, but in order that the products C, which have been separated but still adhered to the lower mold 33 or the upper mold 32 may be removed, the push rod 64 of the upper mold 32 is moved downwardly by guide rail 70 to push the inner die 67 from the die 60, the push rod 102 of the lower mold 33 is moved upward by guide rail 111 to push up the inner die 112 from the die 84, and thus the products C are pushed down from the upper mold 32 or pushed up from the lower mold 33 to be removed (positions c to d in FIG. 26). This pushing or ejecting operation is effected two times because, on each of the guide rails 70, 111, there are provided two respective projections. Then the products C, C, molded to desired shape from the sheet material 191, are sucked by vacuum into the discharge port 148 and are transferred to the product cyclone.

The belt-form scrap or scrap belt 192 from which the products C, C have been severed is gripped by the rotating cutters 164, 164, and the fixed cutters 166, 167 of the crushing mechanism through the knurled roll 157 and the rubber roll 154, and transferred to the cyclone for crushed material.

In FIG. 26, the path from a to b is the pressing section of the upper molds 32 and the lower molds 33, the position b is the cutting section, the path from c to d is the ejection section, and the position c to a is the mold opening or releasing section of the upper molds 32 and the lower molds 33.

Since the die 1 mounted on the extruder A is angularly adjustable, it is possible to adjust the die so that the extruded sheet material 191 may be introduced, in a most appropriate condition, between an upper mold 32 and a lower mold 33 mounted on the rotor 34. Even when such an angular adjustment is effected, there is no possibility of loosening of the clamping by the clamp 19, and the clamp 19 is so adapted that no damage occurs to parts of the die 1 due to thermal expansion, and the clamp 19 can prevent leaking of resin by virtue of its construction.

When the products C are separated from the sheet material 191, the blade 85 at the upper edge of the sliding cylinder 86 of the lower mold 33 is lifted while being rotated slightly, that is, the blade 85 is operated in a "rotary cutting" manner, so that the outer periphery of the product C taken out of the polyethylene sheet material 191 is particularly neat and trim, beautiful, and of excellent appearance.

Even when the rotor, which has a large weight, stops due to an overload thereon, engagement of the worm wheel and the upper friction member, in the driving mechanism which rotates the rotor, is released due to the slip between the friction member and the worm wheel, so that the rotation of the worm shaft is not transmitted to the driving shaft, and the various mechanisms of the motor, clutch, speed changer, reducer, etc. are not damaged.

It is to be understood that the above description shows only an example of the present invention, and various change and modification of design may be effected without departing from the spirit and scope of the present invention. For example, the blank material extruded from extruders may be preliminarily molded through embossed rolls or press rolls, and then the preliminarily molded material may be introduced into the molding machine proper.

As for the plasticizing apparatus which plasticizes a material into the moldable state, a mastication roll, etc. can be used instead of the extruder.

In this invention, a thermoplastic synthetic resin material which is plasticized in a moldable state is caused to be gripped between the upper and lower mold of the rotor, the material is press molded into a predetermined product shape by means of the upper mold and the lower mold, the products are separated from the material by means of a cutting mechanism, the individual products are separated from the scrap belt, the products are automatically collected, and the scrap belt is crushed, and in this way small-sized articles such as crown disks can be produced continuously, so that it is possible to produce a great number of products in a short time.

Furthermore, as in the present example, since the present method is carried out by adapting the linear speed of extrusion of the extruder to the peripheral speed of the rotor appropriately, and causing the plastic sheet material from the extruder to be gripped between the upper mold and lower mold mounted on the rotor under an appropriate condition, so as to press and mold the products, it is possible to mold precisely even when the products have extremely thin wall portions. The products and the scrap belt are separated when the sheet material attains a state appropriate for being cut by each of the mechanisms operated as the rotor is rotated, the products are collected automatically, and the scrap belt is crushed. Thus, the kneading, melting, extruding and molding of the thermoplastic synthetic resin material, the separation of products, and treatment of the scrap are carried out continuously, so that the overall heat loss is small, and no transferring means are required. Thus the invention has great effect or merit as a method and apparatus for producing a great number of small articles such as crown disks using thermoplastic synthetic resin as the material. Accordingly the present invention is well adapted to the characteristics of thermoplastic synthetic resin, and is particularly suitable for the production of molded articles having an extremely thin portion.

What is claimed is:

1. In an apparatus for producing thermoplastic synthetic resin moldings, including a rotating base on the molding machine proper, upper and lower molds mounted on the rotating base, and driving mechanism rotating the base, the improvement in which said driving mechanism includes a driving shaft, a worm shaft, a worm gear meshing with said worm shaft and loosely fitting said driving shaft, upper and lower friction members engaging the upper and lower surfaces of said worm gear, said lower friction member being fixed to rotate with said driving shaft and said upper friction member being slidable on said driving shaft, a spring pressing said upper friction member against said worm gear, a pinion fixed on said driving shaft and a gear on said rotating base and meshing with said pinion.

2. In an apparatus for producing thermoplastic synthetic resin moldings, including a rotating base on the molding machine proper, and upper and lower molds mounted on the the rotating base, the improvement comprising interconnected actuating mechanisms for said upper and lower molds, and interengageable cutting mechanisms on said upper and lower molds, each interconnected actuating mechanism including a supporting member for the lower mold, an actuating shaft having said supporting member fixed to its lower end, a guide rail operable to vertically reciprocate said actuating shaft, an inner pipe rod mounted for vertical reciprocation through a guide hole formed in said supporting member, the upper end of said inner pipe rod being slidably engaged through a lower mold mounting aperture on said base to extend parallel with said actuating shaft, said inner pipe rod having a threaded portion, an adjusting nut threaded onto said threaded portion, a spring embracing said inner pipe rod between said adjusting nut and said supporting member, a nut on the lower end portion of said inner pipe rod abutting the bottom surface of said supporting member, a lower mold die on the upper end of said inner pipe rod, a guiding annular plate fixed on the lower surface of said rotating base and provided with a guide aperture receiving the lower end of said actuating shaft, the upper end of said actuating shaft extending through an aperture in said rotating base, a spring embracing said actuating shaft between said supporting member and the undersurface of said rotating base, and an upper mold mounted on said rotating base in vertical coaxial alignment with said lower mold.

3. In an apparatus for producing thermoplastic synthetic resin moldings, including a rotating base on the molding machine proper, and upper molds and lower molds mounted on the rotating base, the improvement comprising interconnected actuating mechanisms for said upper and lower molds, and interengageable cutting mechanisms provided on said upper and lower molds, each interconnected actuating mechanism comprising a supporting member, a vertically reciprocable actuating shaft having said supporting member secured to its lower portion, a guide rail for reciprocating said actuating shaft, an inner pipe rod having its lower end portion slidably and vertically displaceably engaged through a guide hole in said supporting member, the upper end of said inner pipe rod being slidably engaged through a lower mold mounting aperture of said rotatable base so that said actuating shaft and said inner pipe rod are parallel to each other, said inner pipe rod having a threaded portion, an adjusting nut threaded on to said threaded portion, a spring embracing said inner pipe rod between said adjusting nut and said supporting member, a nut on the lower portion of said inner pipe rod abutting the undersurface of said supporting member, a lower mold die on the upper end of said inner pipe rod, the lower end of said actuating shaft extending slidably through a guide aperture in a guiding annular plate fixed on the lower surface of said rotating base, the upper end of said actuating shaft extending slidably through a guide aperture in a guiding annular plate fixed on the lower surface of said rotating base, the upper end of said actuating shaft extending through an aperture formed in said rotating base, a spring embracing said actuating shaft between said supporting member and the undersurface of said rotating base, and an upper mold mounted on said lower base above said lower mold and in alignment therewith; said cutting mechanism including a receiver member fixed on said inner pipe rod and having at least one hemispherical recess on its upper surface, an outer pipe rod slidably telescoped on said inner pipe rod, a cylinder fixed to the upper end of said outer pipe rod and having its upper surface formed as an annular cutting blade, a spring extending around the upper end of said inner pipe rod, an annular flange portion and a ratchet portion on the lower portion of said outer pipe rod, said annular flange portion having recesses in its undersurface, said receiving member having sloped portions extending from said semispherical recesses to the lower surface of said annular flange portion, steel balls engaged in the recesses of said receiving member and of said annular flange portion, said molding machine having a fixed base, an engaging piece arranged at a predetermined position on said fixed base and arranged to engage said ratchet portion to rotate said outer pipe rod to lift said outer pipe rod by the interaction of said recesses and said steel balls, and an outer die forming part of the upper mold, whereby a rotary cutting is effected by cooperation between said annular blade portion of said cylinder and said outer die.

4. In an apparatus for producing thermoplastic synthetic resin moldings, including a rotating base on the molding machine proper, and upper molds and lower molds mounted on the rotating base, the improvement comprising interconnected actuated mechanisms for said upper and lower molds, interengageable cutting mechanisms on said upper and lower molds, and ejecting mechanism provided on said upper and lower molds, each interconnected actuating mechanism including a supporting member, a vertically reciprocable actuating shaft having a supporting member secured to its lower portion, a guide rail operable to reciprocate said actuating shaft, an inner pipe rod having its lower end portion slidably engaged through a guide aperture formed in said supporting member and having its upper end portion slidably engaged through a lower mold mounting aperture in said rotating base, so that said actuating shaft and said inner pipe rod extend parallel to each other, said inner pipe rod having a threaded portion, an adjusting nut threaded on to said threaded portion, a spring embracing said inner pipe rod between said adjusting nut and said supporting nut, a nut on the lower end portion of said inner pipe rod abutting the undersurface of said supporting member, a die for the lower mold mounted on the upper end of said inner pipe rod, the lower end of said actuating shaft extending through a guide aperture in a guiding annular plate fixed on the lower surface of said rotating base, the upper end of said actuating shaft extending through an aperture in said rotating base, a spring embracing said actuating shaft between said supporting member and the undersurface of said rotating base, and an upper mold mounted on said rotating base above said lower mold and in alignment therewith; said cutting mechanism including a receiving member fixed on said inner pipe rod and having at least one semi-spherical recess in its upper surface, an outer pipe rod slidably telescoped over said inner pipe rod, a cylinder fixed on the upper end of said outer pipe rod and having its upper edge formed as an annular cutting blade, a spring embracing the upper end of said inner pipe rod, a ratchet portion and an annular flange portion on the lower portion of said outer pipe rod, said annular flange portion having recesses formed in its lower surface, said receiving member having sloped portions extending from said semispherical recesses to the lower surface of said annular flange portion, steel balls engaged in the recesses of said receiving member and of said annular flange portion, said molding machine having a fixed base, an engaging piece arranged at a predetermined position on said fixed base and engageable with said ratchet portion to rotate said upper pipe rod and said cylinder for lifting thereof by interaction of said balls in said recesses and on said sloping portions, and an outer die forming part of said upper mold, rotary cutting being effected by engagement of said annular blade of said sliding cylinder with said outer die; said ejecting mechanism comprising a push rod inserted into a supporting cylinder forming part of said upper mold, a bifurcated head fixed on the upper end of said push rod, an inner die on the lower end of said push rod, a roller rotatably mounted in said bifurcated head, a spring embracing said push rod between the undersurface of said bifurcated head and a shoulder formed in said supporting cylinder, a guide rail having cam portions arranged to move said push rod downwardly by engagement with said roller to project said inner die downwardly, a second push rod slidable in said inner pipe rod of said lower mold, a roller supporting member at the lower end of said second push rod, a second roller rotatably mounted in said supporting member, a spring embracing said second push rod between the upper end surface of said roller supporting member and engaging a shoulder within said inner pipe rod, an inner die mounted at the upper end of said second push rod, and a second guide rail having cam portions engageable with said second roller to move said second push rod upwardly to project said inner die upwardly.

5. In an apparatus for producing thermoplastic synthetic resin moldings, including a rotating base on a molding machine proper, upper molds and lower molds mounted on the rotating base, and an extruder for feeding plasticized synthetic resin material, the improvement comprising interconnected actuating mechanisms for said upper and lower molds, interengageable cutting mechanism on said upper and lower molds, and a die included in said extruder; said extruder being positioned adjacent said molding machine and said die being angularly adjustable and extruding a strip of plasticized synthetic resin between said upper and lower molds to be gripped therebetween during rotation of said rotating base; the adjusting mechanism of said die including an adapter mounted on said extruder, a receiver secured to said adapter, a fitting member communicating with said receiver, a passage cylinder communicating with said fitting member, and a mouthpiece at the tip end of said passage cylinder forming said die; said fitting member having a cylindrical portion engaged in a cylindrical recess of said receiver; the interengaging portions of said fitting member and said receiver being formed with beveled peripheral flanges; a clamp having an interior groove with beveled surfaces engageable with said beveled peripheral flanges to clamp said receiver to said fitting member; said clamp including plural articulated sections; and nut and bolt means operable on the free ends of said clamp to clamp said articulated sections around said beveled peripheral flanges.

6. An apparatus for producing thermoplastic synthetic resin moldings, comprising a rotating base, upper and lower molds mounted on the rotating base, a cutting mechanism including a die on one of said upper molds, said die having an annular lower edge, said cutting mechanism including a die on one of said lower molds and a sliding cylinder provided on an outer periphery of the die of the one lower mold, said cylinder forming on its upper edge blade means, said cylinder being mounted to rotate and lift the blade means from the surface of the die of said lower mold and about the die of said upper mold, and interconnected actuating means for actuating the upper molds and the lower molds and for rotating and lifting the cylinder and the blade means.

7. An apparatus for producing thermoplastic synthetic resin moldings, comprising a rotating base, upper molds and lower molds mounted on the rotating base, a cutting mechanism including a die on one of said upper molds, said die having an annular lower edge, said cutting mechanism including a die on one of said lower molds and a sliding cylinder mounted on an outer periphery of a die of the lower mold, said cylinder forming on its upper edge blade means, said cylinder being mounted to rotate and lift the blade means from the surface of the die of said lower mold and about the die of the upper mold, interconnected actuating means for actuating the upper molds and lower molds and for rotating and lifting the cylinder and the blade means, and pushing means mounted on said upper molds and lower molds.

8. In an apparatus for producing thermoplastic synthetic resin moldings, including a rotating base, and upper molds and lower molds mounted on the rotating base, the improvement comprising a cutting mechanism including a die on one of said upper molds, said die having an annular lower edge, said cutting mechanism including a die on one of said lower molds and a sliding cylinder provided on an outer periphery of the die of the lower mold, said cylinder forming on its upper edge blade means, said cylinder being mounted to rotate and lift the blade means from the surface of the die of said lower mold and about the die of the upper mold, interconnected actuating means for actuating the upper molds and lower molds for rotating and lifting the cylinder and the blade means, a pushing mechanism provided on said upper molds and said lower molds, and a cooling mechanism for cooling the periphery of said rotating base.

9. In an apparatus for producing thermoplastic synthetic resin moldings, including a rotating base, and upper molds and lower molds mounted on the rotating base, the improvement comprising a cutting mechanism including a die on one of said upper molds, said die having an annular lower edge, said cutting mechanism including a die on one of said lower molds and a sliding cylinder provided on an outer periphery of the die of the lower mold, said cylinder forming with its upper edge blade means, said cylinder being mounted to rotate and lift the blade means from the surface of the die of said lower mold and about the die of the upper mold, interconnected actuating means for actuating the upper molds and lower molds and for rotating and lifting the cylinder and the blade means, a pushing mechanism provided on said upper molds and the lower molds, a cooling mechanism for cooling the periphery of said rotating base, and a collecting mechanism for the product.

10. In an apparatus for producing thermoplastic synthetic resin moldings, including a rotating base and upper molds and lower molds mounted on the rotating base, the improvement comprising a cutting mechanism including a die on one of said upper molds, said die having an annular lower edge, said cutting mechanism including a die on one of said lower molds and a sliding cylinder provided on an outer periphery of the die of the lower mold, said cylinder forming on its upper edge blade means, said cylinder being mounted to rotate and lift the blade means from the surface of the die of said lower mold and about the die of the upper mold, interconnected actuating means for actuating the upper molds and lower molds and for rotating and lifting the cylinder and the blade means, a pushing mechanism on said upper molds and lower molds, a cooling mechanism for cooling the periphery of said rotating base, a collecting mechanism for the products produced and a receiving and crushing mechanism for belt-shaped scraps.

11. An apparatus as in claim 6, wherein a plurality of cutting mechanisms each include a die on one of said upper molds and a die on one of said lower molds, said die on each of said upper molds having an annular lower edge, said cutting mechanisms each including a sliding cylinder on the outer periphery of the die of one of the lower molds, said cylinders each forming on its upper edge blade means, said cylinders each being mounted to rotate and lift the blade means from the surface of the die of said lower mold and about the die of one of said upper molds, said actuating means rotating and lifting each of said cylinders and each of said blade means.

References Cited
UNITED STATES PATENTS

| | | | |
|---|---|---|---|
| 3,235,639 | 2/1966 | Knowles | 18—20 Q X |
| 3,431,598 | 3/1969 | Lueddeke et al. | 18—20 Q X |

FOREIGN PATENTS

| | | | |
|---|---|---|---|
| 594,860 | 11/1947 | Great Britain | 18—20 C |

H. A. KILBY, JR., Primary Examiner

U.S. Cl. X.R.

18—4 C